Figure 1:
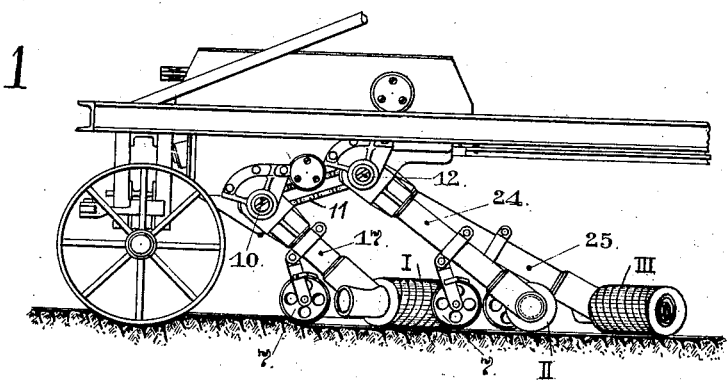

July 16, 1940.　　　M. FILJUGIN ET AL　　　2,207,943
MACHINE FOR TOPPING BEETS
Filed July 21, 1938　　　2 Sheets-Sheet 1

Inventors,
M. Piljugin
W. Piljugin
By Glascock Downing & Seebold
Attys.

July 16, 1940.   M. PILJUGIN ET AL   2,207,943
MACHINE FOR TOPPING BEETS
Filed July 21, 1938   2 Sheets-Sheet 2

Inventors,
M. Piljugin
W. Piljugin
By: Glascock Downing & Seebold
Attys.

Patented July 16, 1940

2,207,943

UNITED STATES PATENT OFFICE 2,207,943

MACHINE FOR TOPPING BEETS

Michail Piljugin and Wassily Piljugin, Moscow, Union of Soviet Socialist Republics Application July 21, 1938, Serial No. 220,580. In the Union of Soviet Socialist Republics April 10, 1936

4 Claims. (Cl. 55—107)

This invention relates to improvements in a machine for harvesting beet crops of the kind in which all harvesting operations are performed, from digging roots out of the ground up to delivering roots cleaned from the soil to the storage or for further treatment.

In the machines of this kind the topping device removing the tops and the uppermost peel from the root heads is followed by a device serving to dig the roots out of the ground, which device is followed by the means serving to remove the soil particles adhering to the roots and to convey the cleaned roots to the collecting chest.

In the well known machines of this kind the topping device comprises two main members, namely, a feeler roller which after having run over the root sets the topping device at the suitable height, and knives which cut away the tops together with the upper part of the root head. Actually the cut takes place at different height from the ground whereby a considerable part of the sugary substance is lost. Moreover the cut surface becomes rough resulting in rotting of the root so that prolonged storing of the roots harvested in this way is impossible.

It is well known also to try to cut the root heads in such a manner as to obtain a spherical cut. For this purpose different forming and milling cutters have been employed but all these trials have so far failed.

One of the important causes of this failure is the impossibility to attain a conformity in the action of the feeler and cutting devices when operating on rough ground and with the roots seated at different heights.

According to the present invention the disadvantages above mentioned are removed by providing new means permitting to obtain a perfectly smooth and substantially spherical cut independently of the roughness of the ground and of the depth at which the roots are lying. Whatever the depth of different roots may be, the cutters being suitably arranged always penetrate into the head of each root to such extent as to take away a layer of the prescribed thickness. The distinctive feature of this invention is that the knives serve at the same time also as feeler members. The new means according to this invention renders it impossible to cut a layer of the root thicker than it is necessary, so that any loss of the valuable sugary substance is excluded.

The topping is performed with three or less or more knives acting in different directions so that the root head is treated in such a manner as to obtain a spherical surface. The first knife not only co-acts with other two knives in cutting the peel, but also cuts off and removes the tops.

The topped roots are then dug out of the ground, freed from the soil particles adhering to them, and fed to the collecting chest, the tailing and removing of the top may also take place. The beets thus harvested may, as proved by experience, be preserved for a long time.

Figure 2:
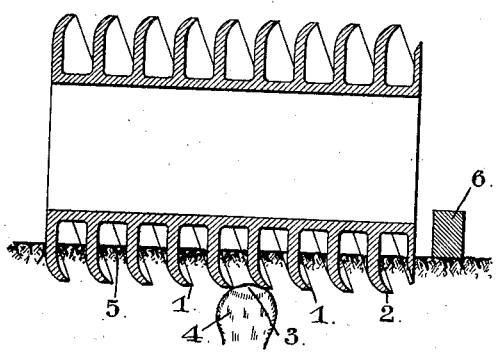
Figure 3:
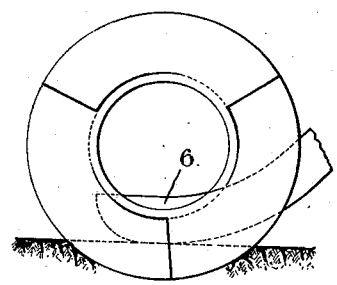
Figure 4:
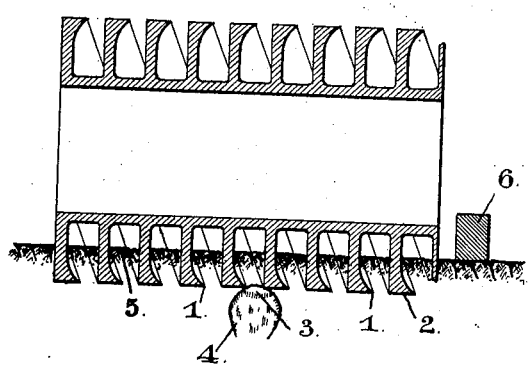
Figure 5:
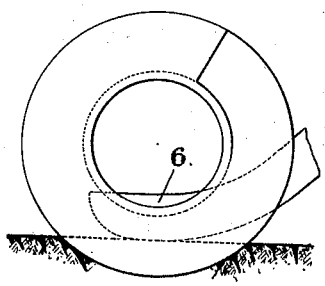
Figure 6:
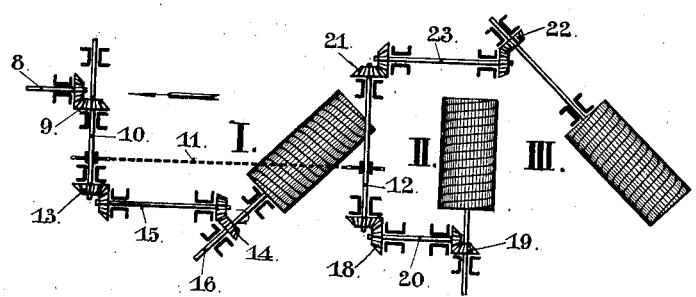
Figure 7:
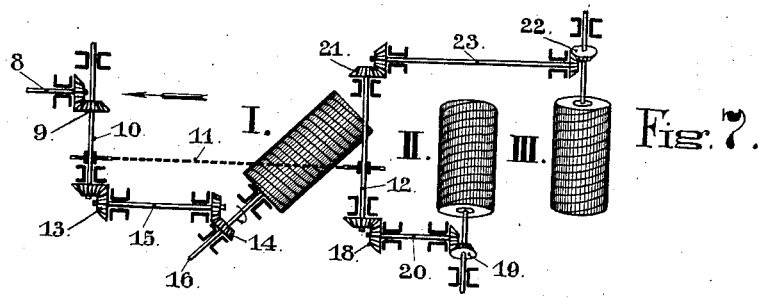
Figure 8:
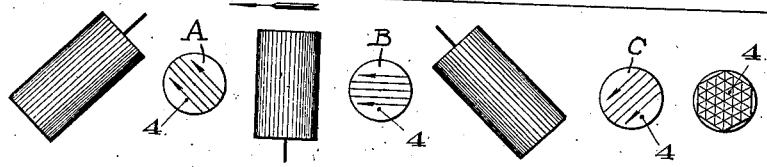
Figure 9:
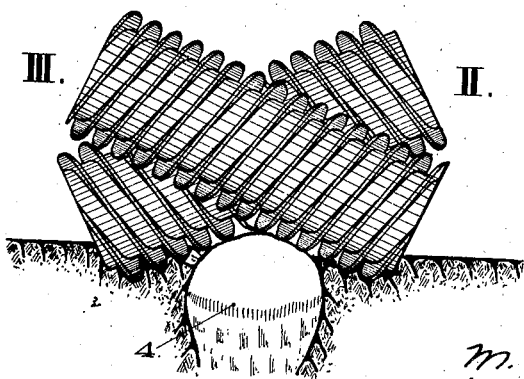

The invention is illustrated in the accompanying drawings in which Fig. 1 shows a side view of the cutting device which may be employed as an independent machine or as a part of a harvesting machine. Figs. 2 and 3 are a section and an elevation of one form of the cutting device which at the same time is also a feeler device. Figs. 4 and 5 are similar views of a second form of device. Figs. 6, 7 show two embodiments of arrangement of the cutting device and their connection to the driving gear of the harvesting machine. Fig. 8 shows diagrammatically how the successive cuts by means of the separate cutting devices take place, and Fig. 9 shows two cutting devices according to Fig. 1 as seen from the back.

As stated, the main feature of this invention is the arrangement of the cutting device as such in such manner that it constitutes also the feeler. According to Figs. 2, 3 and 4, 5 this device comprises a screw-knife the cutting edge 1 of which represents the one-or multiple thread and is confined by a cylindrical outer surface 2, thus having no clearance angle. The distance between the cutting edge 1 and the next back side of the neighbouring twist is substantially shorter than the diameter of the root 4 to be gripped, equalizing approximately to 0.2–0.5 of the diameter of the root head. When the screw-knife is brought into engagement with the root head 4 and is brought into rapid rotation while pressing on the root with its own weight or with an additional load, the edge 1, when moving along the root, cuts off a chip the thickness of which depends upon the distance to which the spherical part of the head 4 advances into the groove of the screw-knife. Thus, the cutting edge, as it is clearly shown in the drawings, cannot penetrate into the root deeper than it could be admitted by the width of this groove, that it is to say by the distance between two neighbouring twists of the screw-knife. At the same time the screw-knife being rotated under pressure on the ground surface descends into it and faces the root which prevents it from its further descending.

This instant the screw-knife begins to act as a feeler device.

In order to limit the descent of the knives into the ground the slides 6 (Figs. 3 and 5) or supporting rollers 7 (Fig. 1) are provided. Figs. 6 and 7 show two forms of the arrangement of the screw-knives and their connection to the main driving shaft of the harvesting machine.

According to Fig. 6 three knives are indicated I, II and III. These knives are arranged horizontally, the knife I forming an angle 45° with relation to the direction of the movement of the harvesting machine, the knife II being arranged perpendicular to this direction, and the knife III forming again an angle 45° with this direction but in opposite direction to the knife I. Fig. 8 shows how the cutting occurs by the successive travel of all three knives. The first knife I encountering the root rolls over it and as the circumferential speed of the knife is many times as great as the progressive speed of the machine the root 4 is cut in direction of the arrows A. The tops are cut and thrown away owing to the rotation of the knife. The second knife II performs a cut in direction as shown at B, while the third knife cuts as shown at C. The root head obtains thus a substantially spherical surface.

Another arrangement of the knives I, II, III is shown in Fig. 7. The knife I is arranged horizontally (as in Fig. 6) at 45° with relation to the direction of the movement of the machine, the knives II and III being arranged perpendicular to this direction but slightly inclined in opposite direction. This arrangement is shown also in Fig. 9 demonstrating the manner in which the knives roll over the root head. Figs. 6 and 7 show at the same time the driving connection between the knives and driving mechanism of the harvesting machine. As it is seen, the driving axle 8 by means of the bevel gear 9 turns the shaft 10 connected through the chain drive 11 with the second shaft 12. The shaft 10 operates the driving means for the knife I comprising the bevel gears 13 and 14, connected to each other by means of the shaft 15. The bearings of the shafts 15 and 16 are secured to the crank pipe 17 (Fig. 1) pivotally connected to the shaft 10, said connection permitting the cutting device to press with its own weight upon the ground whereby the cutting edge I may descend into same, and adjusts itself to the root head. In the embodiment of the invention according to Fig. 1 the rollers 7 pivotally connected to the pipes 17 serve to limit the deepening of the edge I.

The cutting devices II and III are driven from the shaft 12 by means of the gear 18, 19 secured to the shaft 20 and by means of the other gears 21, 22 secured to the shaft 23. The shaft 20 together with its bearing and gears is located in a crank pipe 24 and the shaft 23 in a crank pipe 25, both pipes being pivotally connected to the shaft 12 (Fig. 1).

The cutting device I should preferably be rotated in the direction opposite to that of the harvesting machine in order that said device will throw off the tops. The rotation of the cutting devices II and III may be chosen in dependence upon the right-handed or left-handed direction of their thread. The cutting devices II and III may be conical as well as cylindrical.

What we claim is:

1. In machines for harvesting beetroot, a device for topping the beet, serving simultaneously as a feeler for locating the beetroot in the soil, as a topper and as a device for limiting the depth of cut, said device including knives formed by a surface of revolution with spiral cutting edges formed by a spiral groove and the surface of revolution, the distance between one cutting edge and the backedge of the spiral nearest to it, being less than the diameter of the top of the beetroot, the clearance angle of the cutting edge being zero; means for rotating the knives and means mounting the knives whereby they may be raised when rolling over the tops of the beetroots protruding from the surface of the soil.

2. In machines for harvesting beetroot, a device for topping the beetroot, serving simultaneously as a feeler for locating the beetroot, as a topper and as a device for limiting the depth of cut, said device including three knives of cylindrical form with cutting edges of spiral form, the distance between the cutting edge and the back edge of the spiral being much less than the diameter of the beetroot, the clearance angle of the cutting edge being zero, the first of the three knives being located in a horizontal plane at an angle of 45° to the direction of the machine's movement, the second of the three knives being located in a horizontal plane perpendicularly to the direction of the machine's movement, the third knife being located in a horizontal plane but at an angle of 90° to the first mentioned knife, all three knives rolling over the surface of the soil; means for rotating the knives and means mounting the knives whereby they may be raised when rolling over the tops of the beetroots protruding from the surface of the soil.

3. In a machine for harvesting beetroot, a device for topping beetroot, serving simultaneously as a feeler for locating the beetroot, as a topper and as a device limiting the depth of cut, said device including three knives of cylindrical form with cutting edges of spiral form, the distance between cutting edge and back edge of the spiral being much less than the diameter of the top of the beetroot, the clearance angle of the cutting edge being zero, the first of the three knives being located in a horizontal plane at an angle of 45° to the direction of the machine's movement, the other two knives being arranged at an angle of 90° to the direction of the machine's movement but located each in a separate plane, both planes inclined to the horizontal but in opposite directions; means rotating the knives, and means mounting the knives whereby they may be raised when rolling over the tops of beetroots protruding from the soil.

4. A device for topping beetroot, serving simultaneously as a feeler for locating the beetroot, as a topper and as a device for limiting the depth of cut and comprising three knives of cylindrical form with cutting edges of spiral form, the distance between the cutting edge and the back edge of the spiral being much less than the diameter of the top of the beetroot, the clearance angle of the cutting edge being zero; means for rotating the knives, drive means including shafts; and means mounting the knives whereby they may be raised when rolling over the tops of the beetroot comprising crank-shaped tubes pivoted to said shafts.

MICHAIL PILJUGIN.
WASSILY PILJUGIN.